(12) United States Patent
Satagopan et al.

(10) Patent No.: US 8,473,634 B2
(45) Date of Patent: Jun. 25, 2013

(54) SYSTEM AND METHOD FOR NAME RESOLUTION

(75) Inventors: Murli Satagopan, Sammamish, WA (US); Kim Cameron, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 3141 days.

(21) Appl. No.: 10/693,516

(22) Filed: Oct. 23, 2003

(65) Prior Publication Data

US 2005/0091402 A1  Apr. 28, 2005

(51) Int. Cl.
*H04L 29/12066* (2006.01)

(52) U.S. Cl.
USPC .......... 709/245; 709/203; 709/204; 709/206; 709/226; 380/270; 726/5

(58) Field of Classification Search
None
See application file for complete search history.

(56) References Cited

U.S. PATENT DOCUMENTS

| | | | | |
|---|---|---|---|---|
| 5,812,776 A * | 9/1998 | Gifford | | 709/217 |
| 5,872,847 A * | 2/1999 | Boyle et al. | | 713/151 |
| 5,991,810 A * | 11/1999 | Shapiro et al. | | 709/229 |
| 6,026,433 A * | 2/2000 | D'Arlach et al. | | 709/217 |
| 6,047,376 A * | 4/2000 | Hosoe | | 726/5 |
| 6,092,196 A * | 7/2000 | Reiche | | 726/6 |
| 6,701,378 B1 | 3/2004 | Gilhuly et al. | | 709/249 |
| 6,990,465 B1 * | 1/2006 | Wandmacher et al. | | 705/26 |
| 6,990,495 B1 * | 1/2006 | Grason et al. | | 707/10 |
| 7,000,012 B2 * | 2/2006 | Moore et al. | | 709/220 |
| 7,065,587 B2 * | 6/2006 | Huitema et al. | | 709/245 |
| 7,100,195 B1 * | 8/2006 | Underwood | | 726/2 |
| 7,131,001 B1 * | 10/2006 | Johnson | | 713/168 |
| 7,139,828 B2 * | 11/2006 | Alkhatib et al. | | 709/230 |
| 7,139,840 B1 * | 11/2006 | O'Toole | | 709/245 |
| 7,171,457 B1 * | 1/2007 | Wilson et al. | | 709/219 |
| 7,206,304 B2 * | 4/2007 | Low et al. | | 370/352 |
| 2002/0114324 A1 | 8/2002 | Low et al. | | |
| 2002/0143989 A1 | 10/2002 | Huitema et al. | | |

(Continued)

FOREIGN PATENT DOCUMENTS

| | | |
|---|---|---|
| JP | 2001297027 A | 10/2001 |
| JP | 2002229836 A | 8/2002 |

(Continued)

OTHER PUBLICATIONS

Christian Huitema MS#167537.1 Microsoft Corporation, version 1. "Server-less Name Resolution Protocol." Mar. 2001.*

(Continued)

*Primary Examiner* — Tony Mahmoudi
*Assistant Examiner* — Tuan-Khanh Phan
(74) *Attorney, Agent, or Firm* — Merchant & Gould PC (57) ABSTRACT

In accordance with various aspects, the present invention relates to accessing and publishing documents between two computer systems or nodes that are connected together in a network environment. The system and method for name resolution stores an identity information document containing a user-friendly handle signifying identity, such as an email address, and a machine location, such as an IP address, for the publishing computer system where the documents are stored. Next, the system and method intercepts an initial request for access to documents when the initial request includes a user-friendly handle and replaces the user-friendly handle with the machine location, so that network users may easily access these documents through knowledge only of the user-friendly handle.

42 Claims, 7 Drawing Sheets

U.S. PATENT DOCUMENTS

| | | | |
|---|---|---|---|
| 2002/0169892 A1* | 11/2002 | Miyaoku et al. | 709/246 |
| 2003/0177178 A1 | 9/2003 | Jones et al. | 709/203 |
| 2004/0117404 A1* | 6/2004 | Crivella et al. | 707/104.1 |

FOREIGN PATENT DOCUMENTS

| | | |
|---|---|---|
| JP | 2002278903 A | 9/2002 |
| JP | 2003218941 A | 7/2003 |
| JP | 2004363685 A | 12/2004 |
| JP | 2006053581 A | 2/2006 |
| RU | 2157596 C2 | 10/2000 |
| RU | 2170454 C2 | 7/2001 |
| WO | WO 00/74334 | 12/2000 |
| WO | 02075572 A1 | 9/2002 |

OTHER PUBLICATIONS

Steven M. Bellovin et al. "Encrypted Key Exchange: Password-Based Protocols Secure Against Dictionary Attacks". 1992. IEEE.*
Q Xie et al. "Endpoint Name Resolution Protocol (ENRP)". May 2, 2002. Network Working Group. www.ietf.org/proceedings.*
Shouhuai Xu et al. "Authenticated Multicast Immune to Denial-of-Service Attack". Feb. 2003. ACM.*
Chun-Li Lin et al. "Three-party Encrypted Key Exchange: Attacks and A Solution". May 2000.*
Steven M Bellovin et al. "Augmented Encrypted Key Exchange: A Password-Based Protocol Secure Against Dictionary Attacks and Password File Compromise". 1st Conference Computer & Comm. Security. 1993 ACM. AT&T Bell Laboratories.*
George Coulouris et al. "Secure Communication in Non-uniform Trust Environments". Jul. 1998. ECOOP Workshop on Distributed Object Security.*
Sui Man Lui et al. "Interoperability of Peer-to-Peer File Sharing Protocols". Aug. 2002. ACM SIGecom Exchange.*
Stefan Saroiu et al. "A Measurement Study of Peer-to-Peer File Sharing Systems." 2002. University of Washington.*
Mills-Tetty Ayorkor et al. "Security Issues in the ABELS System for Linking Distributed Simulations". 2003. IEEE Proceedings of the 36th Annual Simulation Symposium.*
PCT International Search Report for PCT/US04/24341.
Kent, Stephen, *Evaluating Certification Authority Security*, 1998 IEEE Aerospace Conference Proceedings, vol. 4, pp. 319-327.
Lee et al., *Concatenated Wireless Roaming Security Association and Authentication Protocol using ID-Based Cryptography*, Conference Proceedings of the IEEE Vehicular Technology Conference, vol. 2, New York, NY c.1978-1979, pp. 1507-1511.

Xuhua Ding and Gene Tsudik, *Simple Identity-Based Cryptography with Mediated RSA*, The Cryptographers' Track at the RSA Conference 2003, San Francisco, CA, Apr. 13-17, 2003, pp. 193-210.
Mevel and Simon, *Distributed Communication Services in the Masix System*, Conference Proceedings of the 1996 IEEE Fifteenth Annual International Phoenix Conference on Computers and Communications, Mar. 27-29, 1996, pp. 172-178.
Ninghui Li, *Local Names in SPKI/SDSI*, Proceedings of the 13th IEEE Computer Security Foundations Workshop, 2000, pp. 2-15.
Australian First Office Action in Application No. 2004279198 dated Sep. 23, 2009, 2 pages.
Australian Second Office Action in Application No. 2004279198 dated Mar. 4, 2010, 26 pages.
Australian Notice of Allowance in Application No. 2004279198 dated Jun. 2, 2010, 3 pages.
Canadian Examination Report in Application No. 2501466 dated Apr. 20, 2012, 3 pages.
Chinese First Office Action in Application No. 200480001309.7 dated Jul. 27, 2007, 3 pages.
Chinese Notice of Allowance in Application No. 200480001309.7 dated Feb. 4, 2011, 4 pages.
European Office Action in Application No. 0429.407.8 dated Mar. 21, 2012, 8 pages.
Japanese First Office Action in Application No. 2006-536581 dated Oct. 16, 2009, 6 pages.
Japanese Final Office Action in Application No. 2006-536581 dated Jun. 8, 2010, 4 pages.
Japanese Notice of Rejection in Application No. 2006-536581 dated Apr. 3, 2012, 4 pages.
Korean Notice of Preliminary Rejection in Application No. 10/2005/7007527 dated Feb. 11, 2011, 11pages.
Russian Office Action in Application No. 2005120234 dated Sep. 25, 2008, 3 pages.
Samdarshi, Pali, "Setting Up Web Services using Dynamic Domain Name Server (DDNS)" Jul. 28, 2001, 4 pages.
Takahashi, Kentaro, "Is It True Mac is Bad for the Net?" Nikkei Business Publications, Inc., Feb. 22, 2011, 2 pages.
Supplementary European Search Report in Application 04779407.8, mailed Jun. 30, 2011, 6 pgs.
Japanese Appeal Decision and Notice of Allowance in Application 2006-536581, mailed Aug. 7, 2012, 4 pgs.
Russian Decision to Grant in Application 2005120234, mailed Apr. 28, 2009, 20 pgs.

* cited by examiner

SYSTEM AND METHOD FOR NAME RESOLUTION

FIELD OF THE INVENTION

The present invention relates to publishing documents and information stored on individual machines, or nodes, in a distributed network and sharing these documents with other nodes in the network. More particularly, the present invention relates to systems and methods for providing another user access to such published documents.

BACKGROUND OF THE INVENTION

In distributed networks or systems having many connected nodes or processes, the ability to share files, documents, and information between nodes of the network is important.

There are several conventional ways that users may share files and documents, including posting the documents on web servers, where access may be open to anyone or restricted to pre-approved users by a password protection system. The problem with this system is two-fold. First, it typically requires a third party, such as a web-hosting service, to maintain the documents on a server computer, which generally requires an initial set up fee and recurring maintenance fees. Second, the involvement of a third party inherently reduces the user's control over the files or documents stored on the web server.

Another way to share files among users of a distributed network is for a user who wishes to share files ("the publisher") with another user ("the accesser") to provide the accesser with his or her machine location, and a path name on the machine where the documents are stored. The accesser accesses the publisher's documents by entering the machine location and path name into a web browser or other access program to reach the publisher's machine. In this situation, the publisher's machine typically provides a security system that permits access only to approved accessing users.

In order to enter the machine location, the user must know the same. One method of entering the machine location involves entering an Internet Protocol ("IP") address. An "IP Address" is a unique string of numbers that identifies a computer on the Internet. IP addresses contain 32-bits, organized into four sets of three-digit numbers between 0 and 255, which are separated by periods, like this: 123.123.023.002. All machines on the Internet must have an IP address and no two computer systems may have the same IP address at the same time. IP addresses may be dynamic or static. A static IP address is one that is permanently assigned to a computer system—it is the only IP address used by that system. A dynamic IP address is one that is assigned on the fly from a group of IP addresses assigned to an organization, for example. Although no IP address can be used for two computer systems at the same time, each computer system may use a multitude of different IP addresses. IP addresses are not user-friendly because they contain only numbers with no readily understandable meaning. For this reason, it is nearly impossible for people to remember their own IP addresses, let alone the IP addresses of machines belonging to other people.

The Domain Name System (DNS) makes it easier to find machine locations by allowing a familiar string of letters (the "domain name") to be used instead of the arcane IP address. So instead of remembering and typing 66.201.69.207, users can type www.microsoft.com. Domain names are also used for reaching e-mail addresses and for other Internet applications. The domains names are resolved, i.e., converted from the domain name to the IP address, through a service hosted on a number of servers located throughout the Internet. However, DNS has at least two limitations. First, it requires the use of third party equipment, the DNS servers, to handle the name resolution. Second, it is not very secure because almost anyone can determine a specific machine name and location for any computer system. Therefore, the conventional DNS is not a very effective method for publishing resources on a computer system.

Another way to get a machine location is to use a public key. Public keys are associated with a particular person and consist of a long string of bytes, for example 32 numbers and letters, such as KP12JSP2345L1298FE23KLKSERQOC38S. Public keys are typically used to enable users of an unsecure public network, such as the Internet, to securely and privately exchange data through the use of a public and a private cryptographic key pair that is obtained and shared through a trusted authority. Public key cryptography is the most common method on the Internet for authenticating a message sender or encrypting a message. Public keys may be obtained in a number of ways. For example, a public key may be created and assigned by an operating system when a person creates a user account on a computer system. Alternatively, in public key cryptography, a public key and private key are created simultaneously using the same algorithm by a certificate authority.

Public keys are connected to machine locations through use of the peer name resolution protocol ("PNRP"), which stores each person's public key with their current location in a publicly available table or some other searchable data structure. Thus, if you know a person's public key, one may use PNRP to determine its associated current machine location, which is usually in the form of an IP address. However, like an IP address, a public key is a string of many bits that have no meaning and even harder to memorize than the IP address itself.

Yet another way to determine a machine location involves receiving (such as through email) a link that incorporates or contains the machine location. When the link is selected, the browser automatically enters the IP address or public key associated with the link into the browser. Unfortunately however, an accessing principal would need to save the email and find and open it every time the accessing node wanted to access the publishing node's resources. This is time consuming, cumbersome, and wastes storage capacity on the accessing machine.

The invention may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

SUMMARY OF THE INVENTION

The present invention relates to accessing and publishing documents between two computer systems or nodes that are connected together in a network environment and more particularly relates to a system and method for name resolution between a user-friendly handle signifying identity with a machine location where the documents are stored, so that network users may easily access these documents through knowledge of the user-friendly handle. In other words, a user's documents may be accessed through use of a user-friendly handle identifying the user and a path name that describes the documents of interest, which are resolved to a machine location where the documents are stored. An email address is an exemplary example of a user-friendly handle and an IP address or public key are exemplary examples of machine locations. The computer system or node where the documents are stored is referred to as the publishing computer system or node and the computer system that seeks to access documents stored on the publishing node is referred to as the accessing computer system or node.

In accordance with particular aspects, a method of accessing documents stored on a first publishing computer system through a second accessing computer system begins when an identity information document from the first computer system is stored on the second computer system. The identity information document has, at a minimum, a user-friendly handle identifying a principal and a machine location for the first computer system. When an initial request for access to documents containing the user-friendly handle is made, it is intercepted by the second computer system. The second computer system replaces the user-friendly handle with the machine location and sends the amended request to the machine location of the first computer system. This method allows the second computer system to access documents on the first computer system with knowledge only on the user-friendly handle. Knowledge of the machine location, IP address, or public key for the first computer system is not necessary.

In accordance with other aspects, the present invention relates to a method of publishing documents between a plurality of nodes connected in a network environment. The method begins by sending an identity information document from a publishing node to an accessing node. The identity information document includes at least a user-friendly handle identifying a principal and a machine location for the publishing node. The identity information document is thereafter stored on the accessing node. When an initial request for access to documents is made from the accessing node to the publishing node, the user-friendly handle is resolved with the machine location. Next, the amended request for access to documents is sent from the accessing node to the machine location of the publishing node.

In accordance with still other aspects, the present invention relates to a computer system comprising a storage module for storing an identity information document received from a second computer system and a name resolution module connected to the storage module. The name resolution module intercepts requests for access to documents stored at the user-friendly handle of the identity information document and amends the request to replace the user-friendly handle with the machine location from the identity information document.

In accordance with still other aspects, the present invention relates a computer readable medium encoding a computer program of instructions for executing a computer process for name resolution. The process starts with a store operation storing an identity information document from a publishing computer system. Next an intercept operation intercepts an initial request for access to documents stored on the publishing computer system when the initial request contains the user-friendly handle. Last, an amend operation amends the request to replace the user-friendly handle with the machine location.

DETAILED DESCRIPTION OF THE PREFERRED EMBODIMENT

Figure 1:
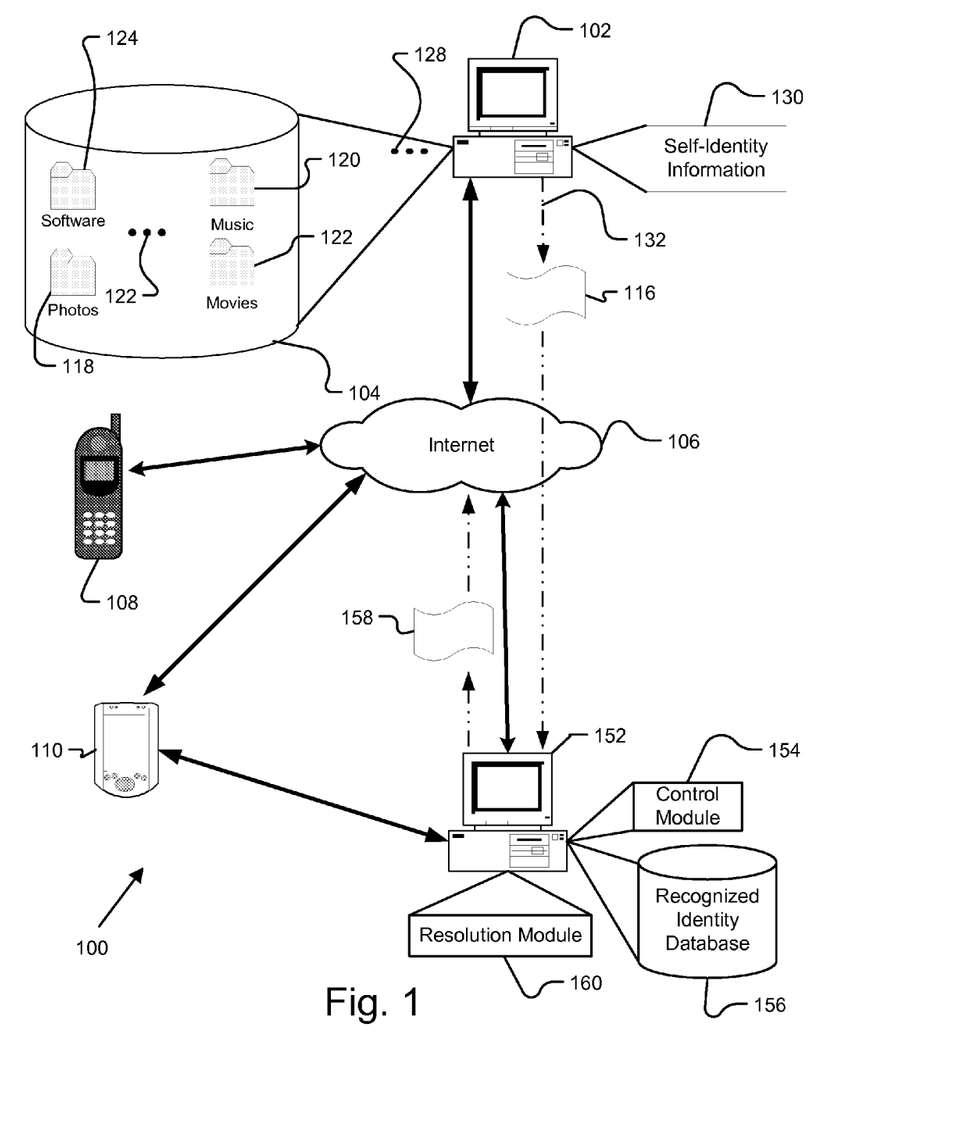
FIG. 1 illustrates a communication or distributed network of nodes that incorporates aspects of the present invention.

A distributed environment 100 incorporating aspects of the present invention is shown in FIG. 1. The environment 100 has at least one computer system 102 and potentially other computer systems such as 108, 110, and 152, wherein the various computer systems are referred to as "nodes" or "machines." As used herein, a "computer system" shall be construed broadly and is defined as "one or more devices or machines that execute programs for displaying and manipulating text, graphics, symbols, audio, video, and/or numbers." Nodes in the network may be any type of computer system, including, without limitation, a telephone such as node 108, a PDA such as node 110, a desktop computer such as nodes 102 and 152, a lap top computer (not shown), and many others. Further, although shown as computer systems, nodes 102, 108, 110 and 152 may alternatively be computer processes within a computer system. Alternatively, the nodes 102, 108, 110 and 152 may combine a combination of separate computer systems distributed across a local area network, a wide area network, or a combination of separate network communications.

As stated, each of the computer systems 102, 108, 110 and 152 are considered nodes within the environment 100 capable of communicating with other nodes within the environment 100 and sharing documents, information, and resources with other network nodes. Furthermore, the nodes may communicate via separate protocols such as TCP/IP or other network and/or communication protocols, implemented over networks such as the Internet 106. That is, although shown as connected by seemingly direct arrows, the separate nodes 102; 108, 110 and 152 may in fact be in communication with other nodes via other indirect ways. Indeed, the connections shown in 100 merely indicate that a node may communicate with another node.

Communication between machines 102, 108, 110 and 152 may be achieved, as stated, by many communication protocols. The definition of a communication used herein relates to the transfer of a message, an event, or any other information from one node to another. In an embodiment, the nodes of environment 100 may be able to communicate with all other nodes in the network 100, but such a requirement is not necessary. In order to communicate information from a first node to a second node, the first node needs the machine location or some other identifying information for the accessing node. Using the machine location, the sending node may send the information using any transfer protocol.

Although only four nodes 102, 108, 110 and 152 are shown in FIG. 1, the network environment may include other nodes. Indeed, the number of nodes for environment 100 may be quite extensive incorporating thousands, to tens of thousands of nodes or more. Hence, the present invention is beneficial in scaling the environment 100 as needed so that practically any number of nodes may communicate information according to the present invention.

The present invention relates to a user-friendly system and method for publishing or sharing resources stored on one network node, the "publishing node," with another network node, the "accessing node." Computer system 102 is an example of a publishing node and includes a database 104 having data organized into one or more directories, or folders, such as folders 118, 120, 122, and 124. The database 104 relates to a generic file system or other organized data system for storing and retrieving electronic documents. As such, the database 104 may include any type of data or file, which will be referred to herein as "documents." The term "documents" should be construed broadly and may include, but is not limited to, photographs, video clips, audio clips, text files, presentations, software code, or any other personal resource stored on a computer system. The documents may be organized within the database in any way, including without limitation, in folders and subfolders with descriptive names. For example, folder 118 may contain "jpeg" files and be entitled "photos," folder 120 may contain audio clips and be labeled music, folder 122 may contain "mpeg" files and be labeled video, and folder 124 may contain executable code and be labeled "software." The ellipse 126 indicates that there may be generally any number of folders in database 104 containing any types of documents.

Although only one database 104 is shown, ellipse 128 indicates that the machine 102 may have more than one database that is organized in the same way or a different way than database 104. For example, the database 104 may be specific to a principal user of the machine and stored in that principal's profile located in the machine 102. As used herein, a "principal" should be construed broadly and defined as any entity capable of acting digitally. Principals include without limitation individual people, groups or sets of people meaning individuals, households, organizations, explicit groups, and people in common roles or people who share attributes of some kind as well as the various electronic devices through which these individuals act. Another principal may have a different database stored in machine 102 that is only accessible by that principal.

Computer system 102 additionally maintains a set of self-identity information 130 that comprises a variety of information about the principal represented by or using the computer system 102. This information, for example, may include a name, email address, website URL, physical mailing address, machine location for the principal's computer system, and other personal information as well as a usage policy describing how this information may be used. Each of these different, identifying elements will be referred to hereafter as identity claims. Importantly, the set of identity claims include at least a user-friendly handle identifying the computer system 102 and a machine location.

Computer system 102 is capable of creating an identity information document 116 containing some or all of the self-identity information 130 and sending the identity information document 116 to any other node in the environment 100 as shown by the dashed arrows 132 in FIG. 1. As used herein, "identity information document" shall mean a subset of identity information for a principal transmitted from one machine to another so as to allow the device that receives the identity information document to recognize the principal and the principal's associated digital events. Details of one possible format for the identity information document 116 will be discussed below with reference to FIG. 3. However, generally speaking, the identity information document 116 may be in a format suitable for transferring information between disparate systems across various types of channels. The channel used to transfer the identity information document 116 from the computer system 102 to a receiving system, such as computer system 152, can be any of a variety of possible media. For example, email, instant messaging, beaming, and many other mechanisms may be used as channels. Further, the channel may or may not be secure.

The computer system 152 is an example of a accessing node and contains a control module 154 that reads the incoming identity information document 116 and accepts it or rejects it depending upon different variables. For example, if the identity information document 116 originates from a known principal, the computer system 152 will accept and store the identity information document 116. However, if an identity information document 116 arrives from an unknown principal, or if there is a fear that impostors have sufficient motivation to open and modify or forge the identity information document 152, the computer system 152 may reject the identity information document 116 or seek further verification of its authenticity.

In an embodiment, once the identity information document 116 is accepted, the identity claims it contains are added to a recognized identity information database 156 of the computer system 152, which may use this information to verify and authenticate the computer system 102 in the future and employ channels of interacting with that principal that may not otherwise be trusted. The principal represented by the identity information document 116 may then, for example, be verified and given access to resources on the computer system 152 such as documents stored in a database like the database 104 of the computer system 102.

Additionally, after the computer system 152 accepts and stores the identity information document 116 in its database 156, it will be able to use the identity claims for the principal of the computer system 102 to more easily and quickly access the documents contained in the database 104 of the computer system 102 as will be explained in detail with reference to FIGS. 4-6.

In general however, the computer system 152 has a resolution module 160 that intercepts requests to access documents on computer system 102, which requests may come from a principal using the computer system 152 or may happen automatically. The initial request from the principal includes a user-friendly handle, e.g., the user friendly handle identity claim from the computer system 102. The resolution module 160 translates the user-friendly handle into a machine location, also received from the computer system 102, and enters the appropriate information into the web browser of the computer system 152, which, in turn, accesses the requested data on the computer system 102. Because of the resolution operation of the resolution module 160, the principal of the computer system 152 does not have to remember the machine location, IP address or public key for the computer system 102, but instead needs only to remember the user-friendly handle (and an associated path).

In one embodiment of the present invention, computer system 152 also contains self-identity information (not shown) and the computer system 102 also contains a control module (not shown) and a recognized identity database (not shown). In order for the principal of computer system 152 to access the documents in the database 104 of computer system 102, the principal of computer system 152 must send its own identity information document 158 to computer system 102 before he or she will be given access to documents in database 104. In other words, there must be a mutual exchange of identity information documents 116 and 158 for a principal of computer system 152 to easily request and gain access to the documents in the database 104. Alternatively, the computer system 102 may not require any verification or authentication process and may allow any accessing principal to access the documents contained in the database 104. In this case, only computer system 102 would need to send the identity information document 116 to computer system 152 in order for system 152 to access the database 104. That is, only a one-way exchange of identity information documents, from the publishing node to the accessing node, is needed.

Figure 2:
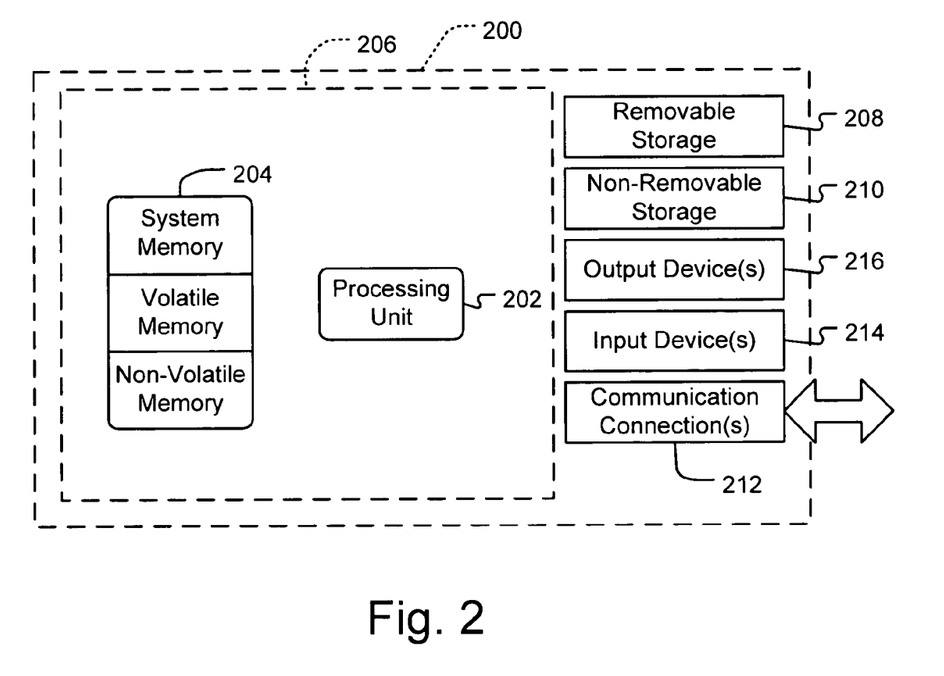
FIG. 2 illustrates a computer system that may be used according to particular aspects of the present invention.

FIG. 2 shows a computer system 200 that may represent one of the nodes, such as 102 or 152 shown in FIG. 1, which receives and disseminates information and publishes and shares documents in accordance with the present invention. The system 200 has at least one processor 202 and a memory 204. The processor 202 uses memory 204 to store documents in databases, such as database 104, self-identity information 130, and recognized identity database 156.

In its most basic configuration, computing system 200 is illustrated in FIG. 2 by dashed line 206. Additionally, system 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by system 200. Any such computer storage media may be part of system 200. Depending on the configuration and type of computing device, memory 204 may be volatile, non-volatile or some combination of the two.

System 200 may also contain communications connection(s) 212 that allow the device to communicate with other devices, such as other nodes 108, 110 or 152 shown in FIG. 1. Additionally, system 200 may have input device(s) 214 such as keyboard, mouse, pen, voice input device, touch input device, etc. Output device(s) 216 such as a display, speakers, printer, etc. may also be included. All these devices are well known in the art and need not be discussed at length here.

Computer system 200 typically includes at least some form of computer readable media. Computer readable media can be any available media that can be accessed by system 200. By way of example, and not limitation, computer readable media may comprise computer storage media and communication media. Computer storage media has been described above. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Figure 3:
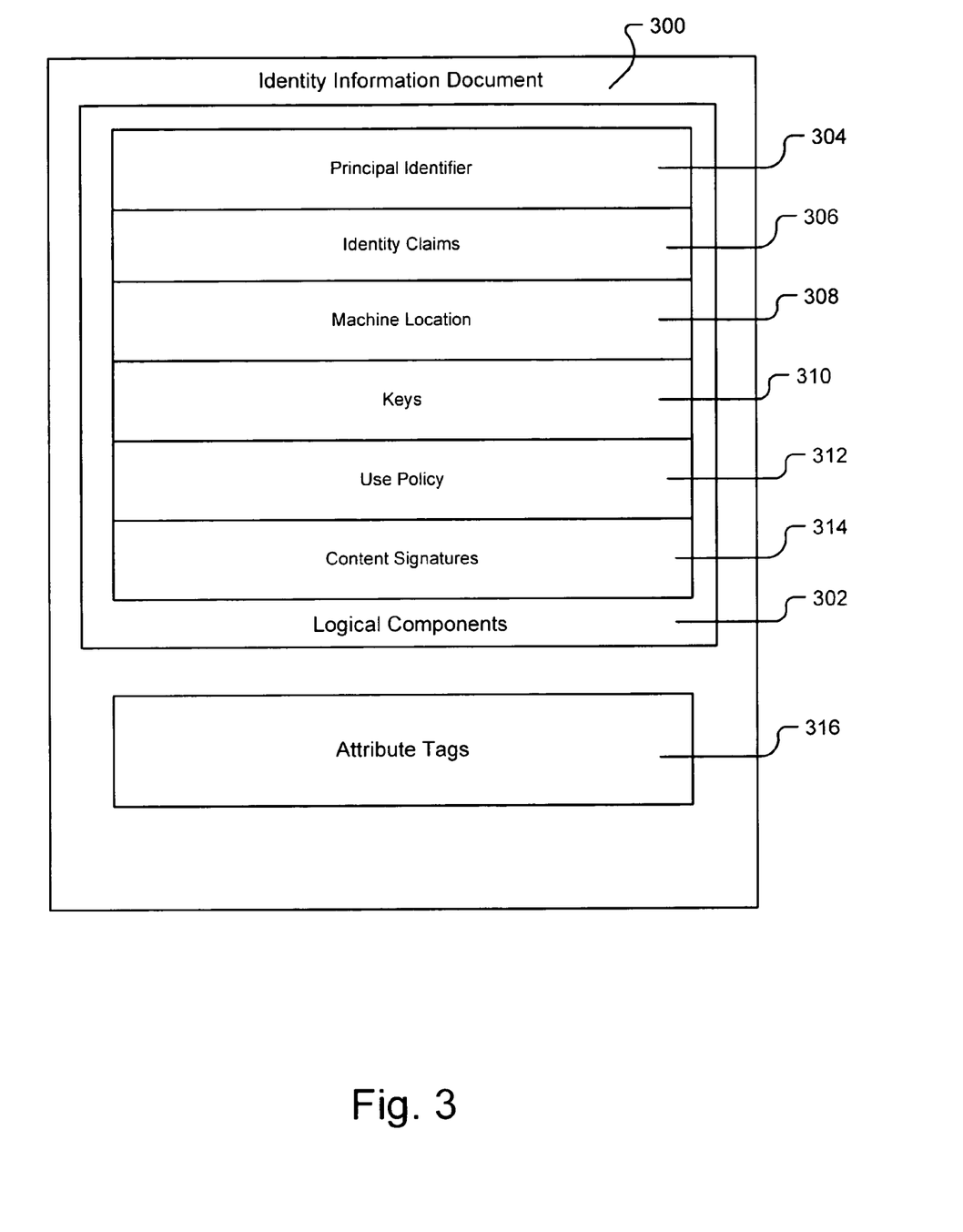
FIG. 3 illustrates the structure of an identity information documents according to particular aspects of the present invention.

FIG. 3 illustrates an exemplary format for an identity information document 300 that may represent one or both of the identity information documents 116 and 158 shown in FIG. 1. As a data structure, the identity information document 300 is a collection of identity claims and other attribute/property claims that may be bound to a public key and governed by an embedded use policy. XML may be used as the encoding language for the identity information document. However, other formats are considered equally suitable. The elements of the identity information document 300 may also be optionally encrypted if they contain information whose confidentiality must be maintained.

The data within the identity information document 300 can be divided into two categories, including a set of logical components 302 and a set of attribute tags 316. The identity information document 300 has six principal logical components: 1) a principal identifier 304; 2) one or more identity claims of the principal 306; 3) a display name and zero or more selectively disclosed attributes of the principal 308; 4) one or more keys 310 for the principal enveloped in any acceptable formats (for example public keys in X509v3 certificates); 5) a use policy that expresses the principal's privacy requirements 312; and 6) a digital signature over the entire content of the identity information that protects the integrity of the data and authenticates the sender in the case of identity information updates 314. Each of these six logical components 302 are discussed in turn below.

The principal identifier 304 is a user-friendly handle that identifies the principal that is the principal of the identity claims contained in the identity information document 300. The preferred principal identifier 304 is the principal's email address if the principal is a person. However, the principal identifier should be construed broadly as any type of user-friendly handle that uniquely identifies a principal and may include, but is not limited to, email addresses, telephone numbers, mobile phone numbers, etc.

Identity claims 306 include additional structured information relating to the principal that is the subject of the identity information document. Identity claims should be construed broadly as descriptive information about a principal that may include, but are not limited to, physical mailing addresses, telephone and facsimile numbers, employer information, date of birth, etc. Even more particularly, "identity claims" are uniquely true about one entity (a person, an organization, etc). Thus, in some instances, a telephone number may be a valid identity claim for one person. For example, a cell phone number, a direct dial work number or a home number may be a valid identity claim for someone who does not share a cell phone, a direct dial work number or who lives alone. In other cases, a telephone may not be a valid identity claim for a single person, such as a home phone number shared by a family of people. In such a case the home telephone number could be an identity claim to represent the household, but not one individual.

The machine location 308 provides a unique address for the principal's computer system, and may include without limitation, an IP address or a public key. Like a physical street address, the machine location is necessary to locate, connect to, and or communicate with a computer system within a distributed network. The machine location 308 may actually include a list of machine locations if a principal has more than one computer system or if the computer system is mobile, such as a laptop computer system or a PDA. In one embodiment, each machine location may contain a list of documents stored at that machine location. For example, if a principal has a first computer system storing jpeg files at a "photos" path name and a second computer system storing sound recordings at a "music" path name, the machine location 308 may include an IP address for each of the first and second computer systems and an indication that "photos" are stored at the machine location for the first computer system and that "music" is stored at the machine location for the second computer system.

The keys portion 310 contains one or more keys, such as public keys encapsulated within a certificate format (for example, X509v3 certificates). The keys 310 can be public keys and can be included in the identity information as recognition information or the subject of the identity information. If a certificate is used, it may be self-signed or issued by a certificate authority.

The use policy 312 conveys the principal's instructions about permissible uses for the contents of the identity information document 300. For example, the use policy 312 may indicate that the contents of the identity information should not be divulged to others. A recipient's recognized identity information database, such as database 156 in FIG. 1, will store the use policy along with the rest of the information defining the principal.

The digital signature 314 provides a principal with the ability to sign data within the identity information document. XML signatures have three ways of relating a signature to a document: enveloping, enveloped, and detached. According to one embodiment of the present invention, the identity information document uses XML enveloped signatures when signing the identity information content.

The identity information document 300 can carry six or more attributes tags 316 relating to the identity information document 316 itself. Although not shown, the attribute tags may include an 1D value for the identity information document 300, version information for the document 300 and/or the principal type that the document 300 represents, e.g., a person, computer or organization. Other attribute tags may also be employed.

In an embodiment, the identity information document is stored in a generalized manner on the primary computer system, such as systems 102 and 402 described above in conjunction with FIGS. 1 and 4, respectively.

Figure 4:
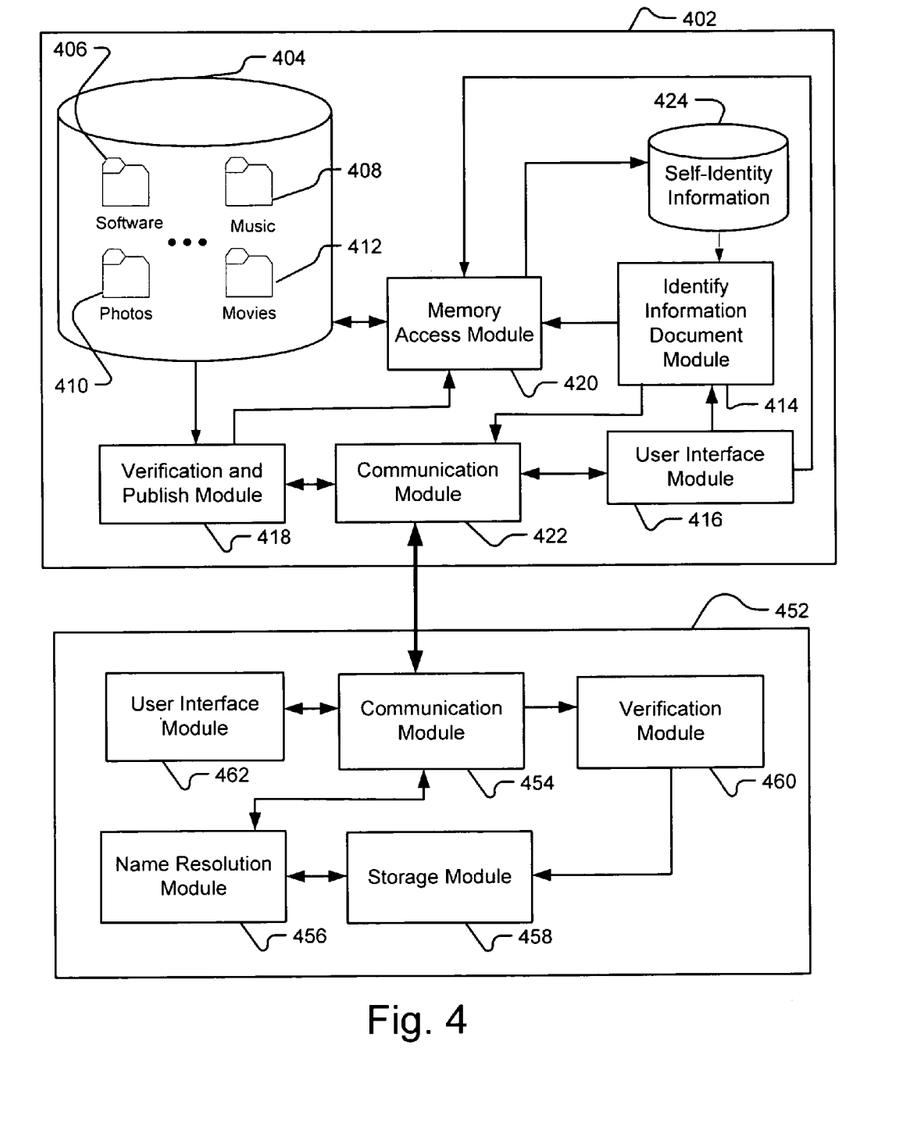
FIG. 4 illustrates a representation of the software environment according to aspects of the present invention.

FIG. 4 illustrates the functional components related to accessing and sharing or publishing documents between two or more computer systems 402 and 450. That is, FIG. 4 represents software components or modules according to aspects of the present invention. In particular, FIG. 4 illustrates a publishing node or computer system 402 and an accessing node or computer system 452 and their associated modules used to publish and access documents according to the present invention. Computer system 402 has among other modules that are not shown, the following components: 1) a database 404; 2) an identity information document module 414; 3) a user-interface module 416; 4) a verification and publish module 418; 5) a memory access module 420; 6) a communication module 422; and (vii) a self-identity information database 424.

Like the database 104 shown in FIG. 1, the database 404 contains documents that may be organized into folders 406, 408, 410, and 412. In this example, these documents represent the documents to be published to the system 452 and thus accessed by system 452.

The user-interface module 416 allows the principal of the computer system 402 to access and control any of the other modules including without limitation, the memory access module 420, the identify information module 414, and the communication module 422. Although the present invention and in particular, the example shown in FIG. 4 contemplates user interaction on the system 402, such is not necessary to accomplish aspects of this invention.

The memory access module 420 allows the computer system 402 and/or the principal to access data stored on the system, such as data contained in the database 402 and/or data contained in the self-identity information database 424. Alternatively, the computer system 402 may access the memory access module 420 through other modules, such as the identity information document module 414 or the verification and publish module 418. The principal uses the user-interface module 416 to control the memory access module 414.

The identity information document module 414 creates identity information documents, such as the identity information document 300 shown in FIG. 3, by using the memory access module 414 retrieve to pull data from the self-identity information database 424. The identity information document module 414 may create an identity information document upon a command from the principal through the user interface module 416 or may alternatively create identity information documents through a standardized procedure without a direct command from the principal. The identity information document module 414 transfers the identity information document to the communication module 422 for communication to other nodes in the network. In other embodiments, the identity information document is simply stored in memory, and, upon request, the document is transmitted to another system via communication module 422.

The communication module 422 controls communications between the computer system 402 and other nodes of the network, including both sending and receiving information to or from other network nodes, such as computer system 452. In general, the principal controls the communication module 422 through the user-interface module 416 and may through this process command that the identity information document be sent to other computer systems, such as computer system 452. The communication module 422 also allows the principal to send other types of information, such as email, to other nodes of the network.

The verification and publication module 420 receives requests to access and publish documents, such as those in database 404, from other network nodes through the communications module 422. In one embodiment, the verification and publication module 422 performs a gate-keeping function and attempts to verify that the accessing computer system has permission from the principal to receive the published documents. If permission exists, the verification and publication module 420 uses the memory access module 420 to retrieve the requested documents and publishes the documents by sending them to the communication module 422 for communication to the accessing computer system. If permission does not exist, the verification and publication module 420 denies the request to publish, which is communicated to the accesser through the communication module 422. In an alternative embodiment, the verification and publication module 420 does not act as a gate-keeper, but rather retrieves and publishes all requested documents.

Computer system 452 is an example of an accessing node, similar to node 152 of FIG. 1, and contains the following components: 1) a communication module 454; 2) a verification module 460; 3) a storage module 458; 4) a name resolution module 456; and 5) a user-interface module 462.

Similar to the user-interface module 416, the user-interface module 462 allows the principal of the computer system 452 to access and control any of the other modules including without limitation, the communication module 422. So, for example the principal of system 452 might use the user-interface module 416 to direct the communications module 422 to send a request to publish documents to the publishing node 402.

Like communication module 422, the communication module 454 controls communications between the computer system 452 and other nodes of the network, including both sending and receiving information from other network nodes, such as computer system 402. The communication module 454 is responsible for forwarding identity information documents that it receives from other network nodes to the verification module 460.

The verification module 460 is responsible for translating identity information documents and determining whether they come from a trusted source, a trusted channel, or can otherwise be authenticated. If the identity information document is accepted, the verification module transfers the identity information document to the storage module 458. In essence, the verification module 460 relates to some function of control module 154 in FIG. 1 in that it reads the incoming identity information document 116 and accepts it or rejects it depending upon different variables.

The storage module 458 stores the identity information document for later uses by the computer system 452. As with the verification module 460, the storage module 458 also performs some of the functions of the control module 154 shown and described in conjunction with FIG. 1 in that it stores accepted identity information documents.

Finally, the name resolution module 456 is responsible for intercepting a request to access published documents from another network node in the form of a user-friendly handle from the communications module 454. As discussed above, the request most likely comes from the principal via the user-interface module 462. The name resolution module 456 further is responsible for searching the storage module 458 for an identity information document with a principal identifier (such as principal identifier 304 in FIG. 3) that matches the intercepted user-friendly handle, amending the request to substitute or replace the user-friendly handle with the machine location set forth in the identity information document, and sending the request to publish documents in the form of the machine location back to the communication module 454. The name resolution module 456 is similar to resolution module 160 from FIG. 1 in that it that intercepts requests to access documents from an accessing node, translates the user-friendly handle into a machine location for the publishing node, and enters the appropriate information into the web browser of the computer system 152, which, in turn, accesses the requested data on the publishing node.

Figure 5:
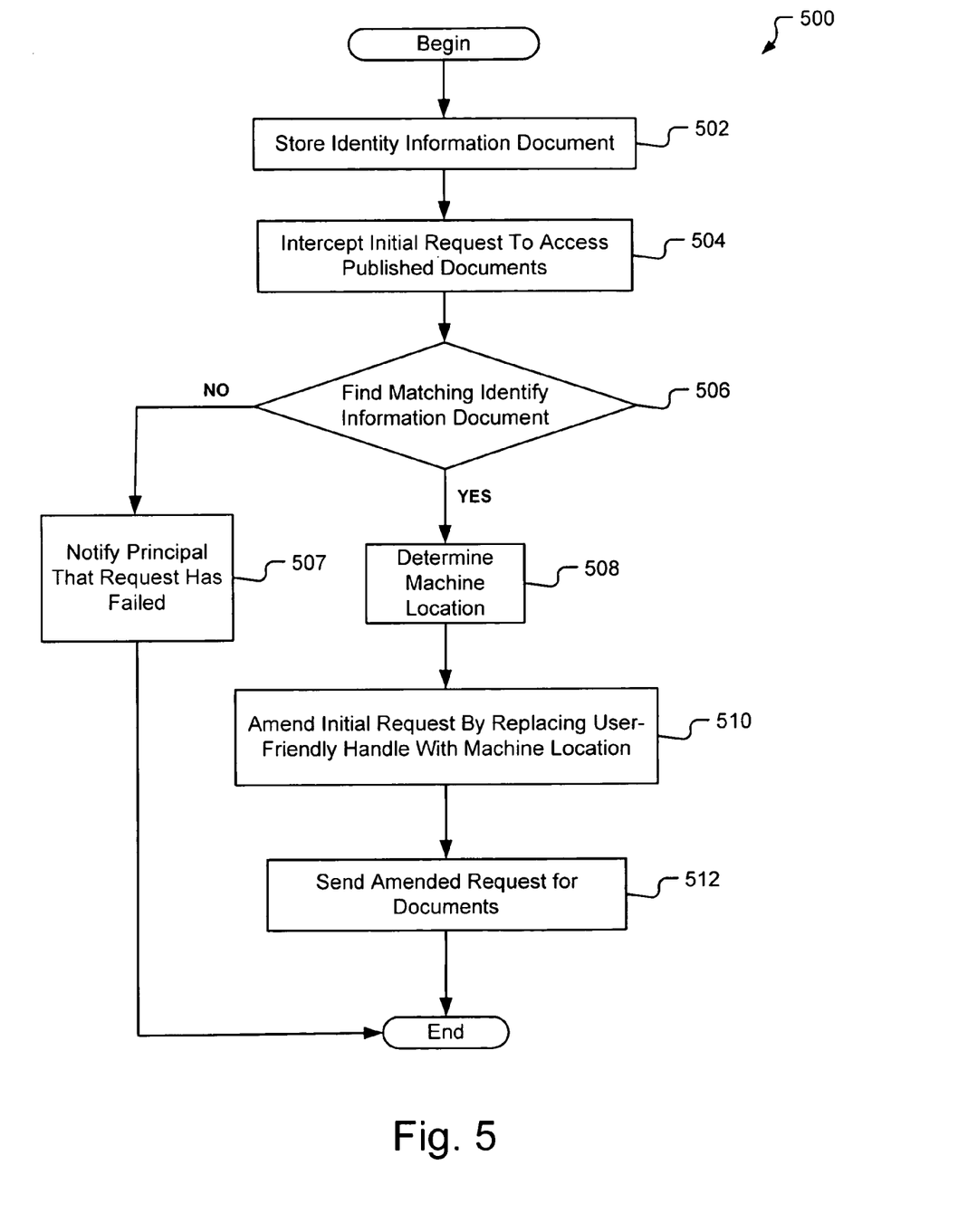
FIG. 5 illustrates a flow chart of operational characteristics of the present invention with respect to an accessing node.

FIG. 5 shows a method for publishing documents located on a publishing computer system, such as computer system 102 in FIG. 1 or 402 in FIG. 4, to an accessing computer system, such as computer system 152 in FIG. 1 or 452 in FIG. 4. Flow 500 generally relates to the process performed by accessing node.

Flow 500 begins with store operation 502, wherein an identify information document, such as one from a publishing node, is stored in a location on the accessing computer system, such as in a recognized identity database 156 from FIG. 1. Like the identity information document 300 shown in FIG. 3, the identity information document received will contain at a minimum a user-friendly handle identifying the principal of the publishing system, such as an email address, and a machine location for the principal's computer system, such as an IP address. Sometime thereafter, intercept operation 504 intercepts an initial request to access published documents that are stored on the publishing node. The request may be one initiated by the principal of the accessing node, one initiated by another modules within the accessing computer system, or an automatic request. The request will be in the form of or contain a user-friendly handle identifying the principal of the publishing node or the publishing node itself. For example, the request may be to access documents located at an e-mail address.

Next, search operation 506 searches previously received and stored identity information documents to determine whether a principal identifier matches the user-friendly handle received in the request operation 504. If the system is unable to locate a matching identity information document in step 506, the flow 500 branches NO 507 which notifies the principal or other module that the request has failed. Upon notifying the principal that the request failed, process 500 ends. At this time, the principal may re-enter the request or another, similar request to start the process over.

If instead search operation 506 locates the matching identity information document, i.e., one that has a principal identifier that matches the e-mail address received at step 504, flow 500 branches YES to determination operation 508. Determination operation 508 determines the machine location, which is included in identity information document located in step 506.

Following determination operation 508, resolution operation 510 replaces the user-friendly handle, e.g., the email address with the machine location, e.g., IP address 123.123.023.002. Next, send operation 512 sends the request to publish documents in the form of the machine location, rather than the user-friendly handle, to the publishing node.

Steps 506 and 508-512 happen behind the scenes and are not revealed to the principal. Rather, it appears to the principal that his or her request for access to the published documents is delivered in the form of the user-friendly handle, the email address, and not the meaningless machine location. In this way, a principal may access documents located on a different computer system through knowledge only of a user-friendly handle identifying the principal of the publishing computer system. The principal of the accessing system does not need to know or remember cumbersome numbers, such as IP addresses, to access these documents.

Figure 6:
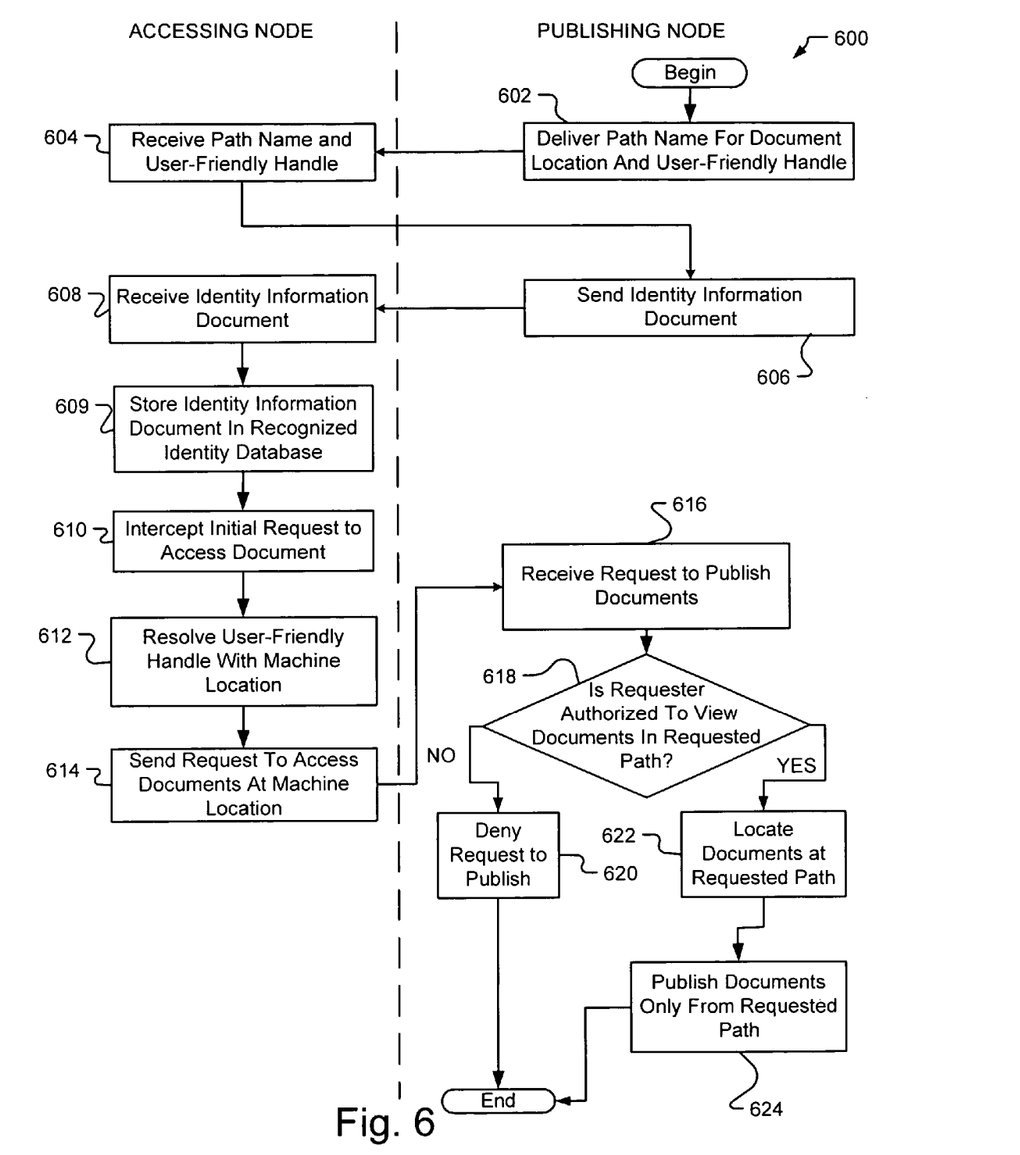
FIG. 6 illustrates a flow chart of operational characteristics of an alternative embodiment of the present invention with respect an accessing node and a publishing node.

FIG. 6 likewise shows a method for publishing documents located on a publishing computer system, but shows both the processes performed by the publishing node, such as computer system 102 or 402, and the accessing node, such as computer system 152 or 452.

Flow 600 begins with deliver operation 602, which delivers to another node, such as the accessing node, a path name for a location of one or more documents and a user-friendly handle identifying the principal of the publishing node. For example, send operation might comprise an email message from the principal of the publishing node, whose name is Bob, that says: "check out my photos at bob@xyz.com/photos." Alternatively, the principal may send the path name and user-friendly handle to the accessing node or principal via a telephone call, faxed document, or by some other means. Flow 600 moves to receive operation 604 where the accessing machine receives the path name for documents and user-friendly handle identifying the principal of the publishing machine. Next, send operation 606 sends the accessing node an identity information document for the principal of the publishing machine, in this example, Bob's identity information document. Receive operation 608 receives Bob's identity information document, followed by store operation 609, which stores the identity information document in a recognized identity database, similar to database 156 described and shown in conjunction with FIG. 1.

In an alternative embodiment, verification operation (not shown) occurs after receive operation 608 and before store operation 609. Verification operation attempts to authenticate the principal represented by the identity information document and makes a decision about whether or not to accept and store the identity information document.

Sometime thereafter, intercept operation 610 intercepts an initial request for access to documents. The initial request may originate from a principal or some other source and seeks to gain access to documents at a user-friendly handle/path location, such as bob@xyz.com/photos. Next, resolution operation 612 resolves the initial request to create an amended request by substituting the user-friendly handle with a machine location using the process described in detail in FIG. 5, namely finding a matching identity information document, determining the machine location, and substituting the machine location for the user-friendly handle.

In an alternative embodiment, parse operation (not shown) separates the user-friendly handle and the path name and searches for a match only with the user-friendly handle portion of the initial request. For example, parse operation would drop "/photos" and search for a principal identifier with Bob's email at bob@xyz.com.

In yet another alternative embodiment, the principal's identity information document includes more than one machine location and an additional search operation (not shown) search each of the machine locations in the identity information document to determine which machine location contains the path name included in the intercepted request. The resolution operation 612 then substitutes the machine location that corresponds with the path name set forth in the initial request.

After completion of resolution operation 612, send operation 614 sends the amended request for published documents using the machine location instead of the user-friendly handle. If a path name is involved, send operation 614 further includes a request to access documents located at that path.

At this point flow 600 shifts back to the publishing machine at receive operation 616, receiving the amended request to access documents at the specified path, in this case, the photos folder, such as folder 118 in FIG. 1. Next, verification operation 618 determines whether the principal of the accessing node is authorized to view the requested documents. If the accessing principal is not authorized, flow 600 branches NO deny operation 620, which denies the request for access to documents and the process ends.

If the accessing principal is authorized, flow 600 branches YES to locate operation 622 which locates the requested documents using the path name included in send operation 614. Finally, publish operation 624 published the requested documents and flow 600 ends.

In one embodiment of the present invention, verification operation 618 checks to determine whether the accessing principal is listed in a recognized identity database, that is, whether the accessing principal has previously sent the publishing node his or her identity information document. If the answer is yes, verification operation 618 branches YES to locate operation 622. Thus, in this embodiment a mutual exchange of identity information documents is required for documents to be published by one machine to another. This is the most secure way to publish documents.

In an alternative embodiment of the present invention, verification operation 618 does not require that the accessing principal send its identity information document. Instead, verification operation 618 may consider other variable in determining whether to allow access to the requested documents or verification operation 618 and deny operation 620 may be omitted from flow 600 altogether. Rather, flow 600 would proceed from receive operation 616 directly to location operation 622. In other words, the publishing machine may decide that it will allow anyone with its identity information document to access documents on its system. Although this method is simpler than the last, it is not as secure as requiring a mutual exchange of identity information documents.

In yet another alternative embodiment, notify operation (not shown) notifies the accessing node that the request for access to documents has been denied. Upon notification, another send operation (not shown) may send the publishing node an identity information document representing the accessing node or its principal and start the process over at intercept operation 610. If the publishing node has received the accessing node's identity information document, flow 600 is more likely to branch YES to location operation 622 than to branch NO to deny operation 620.

In further alternative embodiment of the present invention, the machine location portion of the identity information document may contain a public key rather than an IP address. As used herein, a "public key" should be construed broadly and be defined as a code unique to a principal consisting of numbers and/or letters with no recognized meaning. The foregoing system and methods would work as described above with one exception, described below.

When a pubic key is used as a machine location in the identity information document, the public key is used to look up the principal's current machine location, which may be an IP address, using a peer name resolution protocol ("PNRP"). PNRP generally consists of a distributed system of knowledge including hashes of public keys and current machine locations. Thus the public key is used to find a principal's "current" machine location. As used herein, "current machine location" should be construed broadly to mean a machine location at a given point in time. For example, if a computer system uses a dynamic IP address, its current machine location may change from a first point in time to second, later point in time. Use of a public key and PNRP will allow an accessing node to access documents from a publishing node even if the publishing node is using a dynamic IP address.

Alternatively, a current machine location may change if the machine is mobile, such as a lap top computer system or a PDA. PNRP is capable of tracking current machine locations for mobile machines as well. Further, use of a public key and PNRP will allow an accessing node to access documents from a publishing node even if the publishing node is mobile.

If a public key is used as the machine location, the accessing node must know the publishing node's public key in order to gain access to the publishing node's documents. The only way for the accessing node to get the publishing node's public key is for the publishing node to send the accessing node its key. In this way, the publishing node is able to effectively control those who are able to access its resources by controlling to whom it sends its public key.

Figure 7:
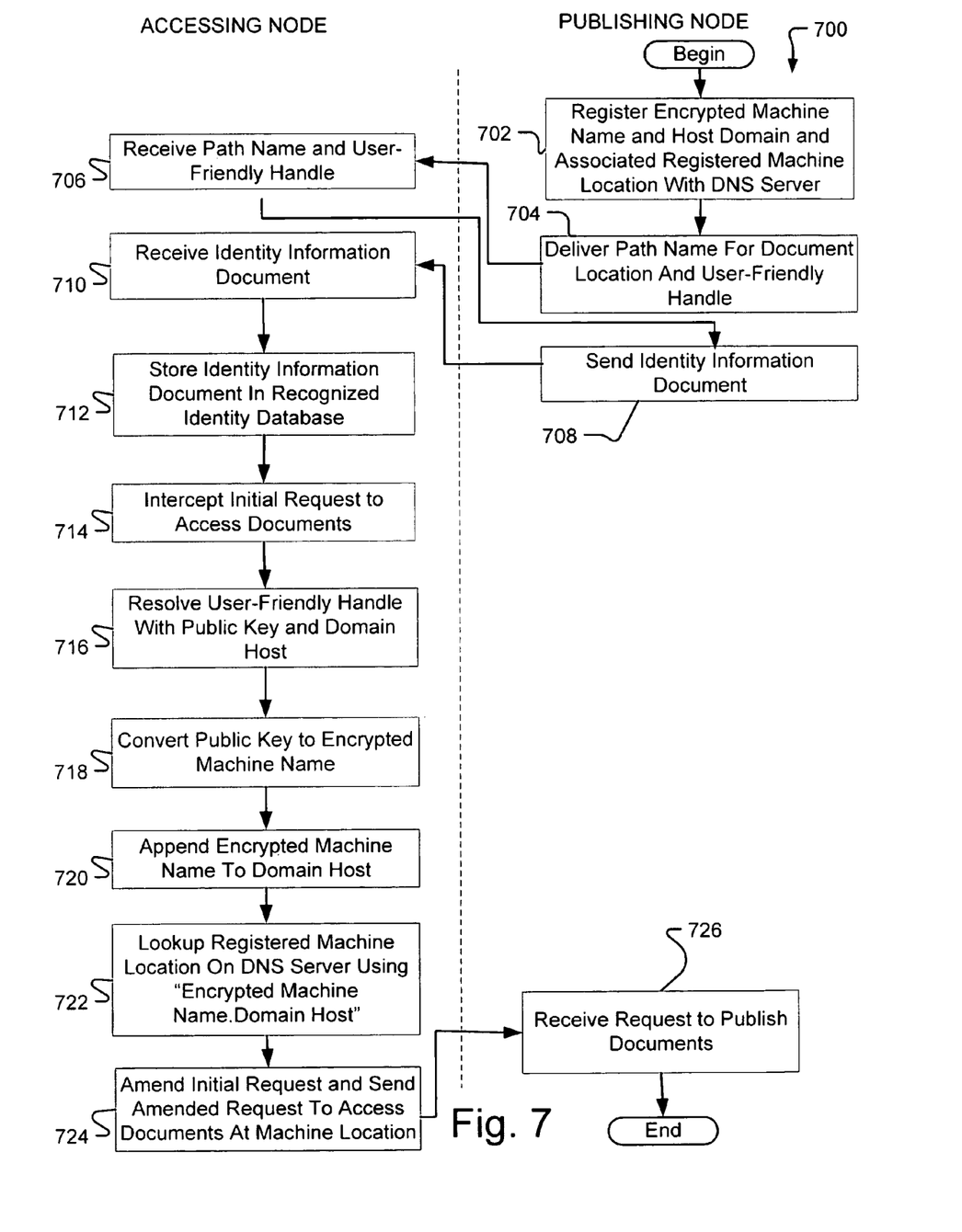
FIG. 7 illustrates a flow chart of operational characteristics of yet alternative embodiment of the present invention with respect an accessing node and a publishing node.

FIG. 7 shows yet another embodiment of the present invention involving a method for publishing documents located on a publishing computer system, such as computer system 102 or 402, to an accessing computer system, such as computer system 152 or 452.

Flow 700 begins with a register operation registering an encrypted machine name, a host domain, and an associated registered machine location with a conventional DNS server. DNS servers generally store a table with machine names appended to host domains along with a corresponding registered machine location, such as an IP address. Network users use the DNS server to look up the registered IP addresses for specific machines. As used herein, an "encrypted machine name" shall mean a public key that has been changed into a secret code that people cannot understand or use on normal equipment. One way to create an encrypted machine name is to apply an algorithm to the public key.

Next, deliver operation 706 delivers a path name for a location of one or more documents and a user-friendly handle identifying the principal of the publishing node. Flow 700 moves to receive operation 706 where the accessing machine receives the path name for documents and user-friendly handle identifying the principal of the publishing machine. Sometime thereafter, send operation 708 sends the accessing node an identity information document for the principal of the publishing machine. The identity information document includes at least a principal identifier, a public key, and a domain host for the principal of the publishing node. Receive operation 610 receives the identity information document, followed by store operation 712, which stores the identity information document in a recognized identity database, similar to database 156 described and shown in conjunction with FIG. 1.

Sometime thereafter, intercept operation 712 intercepts an initial request for access to documents. The initial request may originate from a principal or some other source and seeks to gain access to documents at a user-friendly handle/path location. Next, resolution operation 714 resolves the user-friendly handle in the initial request with a public key and domain host set forth in an identity information document with a principal identifier that matches the user-friendly handle using the process described in detail in FIG. 5.

Next, convert operation 718 performs a computation on the public key to convert it to the encrypted machine name and append operation 720 appends the encrypted machine name to the domain host. In one embodiment, the convert operation comprises performing an algorithm on the public key, wherein the algorithm is the same algorithm used by the publishing node in register operation 702. The algorithm may be a standard algorithm used commonly by many network nodes, or may be a specific algorithm that was received by the accessing node in some other way.

Flow 700 then moves to lookup operation 722, which uses the encrypted machine name/domain host combination to look up the registered machine location on a DNS server. After completion of lookup operation 722, amend operation 724 amends the initial request to substitute the user-friendly handle with the registered machine location and sends the amended request for published documents using the registered machine location instead of the user-friendly handle. If a path name is involved, send operation 614 further includes a request to access documents located at that path.

The benefit of using the method illustrated by flow 700 is that it allows a publishing machine to employ additional security measures while utilizing conventional DNS servers. Normally, DNS addresses are publicly available and potential hackers can use the DNS servers to learn a publishing node's machine name and machine location. Hackers may then use this information to gain unauthorized access to a publishing node's resources. Registering an encrypted machine name with the DNS server prevents hackers from learning the publishing node's machine name, but makes it more difficult for authorized user's to gain access to the publishing node's resources. Process 700 allows authorized accessing nodes to access the publishing node's resources with knowledge only of the user-friendly handle. The publishing node does not need to know the unfriendly encrypted machine name or domain host in order to access the publishing node's resources. Security is enhanced because the accessing node must receive the publishing node's identity information document in order to utilize the name resolution method.

Although the invention has been described in language specific to computer structural features, methodological acts and by computer readable media, it is to be understood that the invention defined in the appended claims is not necessarily limited to the specific structures, acts or media described. As an example, different formats other than XML may be used to encode identification information. Therefore, the specific structural features, acts and mediums are disclosed as exemplary embodiments implementing the claimed invention.

Using the above described methods of name resolution, the present invention established that a user-friendly handle identifying the principal of the publishing machine may be associated with or resolve to a machine location so that the principal of the accessing machine need only know the user-friendly handle in order to access the requested documents on the publishing machine. Further the association process is transparent and occurs without the principal's knowledge or involvement.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of accessing documents stored on a first computer system through a second computer system, the first and second computer systems connected in a network environment, said method comprising:
   storing at the second computer system an identity information document from the first computer system, the identity information document comprising a user-friendly handle identifying a principal and a machine location of the first computer system;
   receiving at a user interface implemented on the second computer system a request for access to documents stored on the first computer system, the request including the user-friendly handle and being directed to the first computer system;
   intercepting at the second computer system the request for access to documents from the user of the second computer system when the request includes the user-friendly handle;
   replacing at the second computer system the user-friendly handle of the request with the machine location; and
   sending the request for access to documents to the machine location of the first computer system.

2. The method of claim 1 wherein the user-friendly handle comprises an email address.

3. The method of claim 1 wherein the machine location comprises an IP address.

4. The method of claim 1 wherein the machine location comprises a public key.

5. The method of claim 1 wherein the request for access to documents comprises a principal-initiated request.

6. The method of claim 1 further comprising an initial step of receiving at the second computer system the identity information document from the first computer system.

7. A method of publishing documents between a plurality of nodes, the nodes connected in a network environment, said method comprising:
    sending an identity information document from a publishing node to an accessing node, the identity information document comprising a user-friendly handle identifying a principal of the publishing node and a machine location for the publishing node;
    storing the identity information document on the accessing node;
    resolving at the accessing node the user-friendly handle with the machine location in a request for access to documents, wherein the request is made to the publishing node from a user of the accessing node via a user interface implemented on the accessing node; and
    sending the request for access to documents from the accessing node to the publishing node.

8. The method of claim 7 wherein the user-friendly handle comprises an email address.

9. The method of claim 7 wherein the user-friendly handle comprises a telephone number.

10. The method of claim 7 wherein the machine location comprises an IP address.

11. The method of claim 7 wherein the machine location comprises a public key.

12. The method of claim 11 further comprising:
    using the public key to determine the current machine location for the publishing node.

13. The method of claim 11 further comprising:
    registering an encrypted machine name and a registered machine location for the publishing node with a DNS server;
    resolving the user-friendly handle with the public key;
    converting the public key to the encrypted machine name;
    using the encrypted machine name to look up the registered machine location for the publishing node on the DNS server; and
    sending the request for access to documents to the registered machine location.

14. The method of claim 7 further comprising:
    verifying that the accessing node has authorization from the publishing node to review the requested documents before publishing the requested documents.

15. The method of claim 7 further comprising:
    delivering a path name for documents stored on the publishing node to the accessing node.

16. The method of claim 15 wherein the path name is delivered to the accessing node by email.

17. The method of claim 7 further comprising:
    delivering a path name for documents stored on the publishing node to a principal of the accessing node.

18. The method of claim 17 wherein the path name is delivered to the principal of the accessing node by a telephone call.

19. The method of claim 7 wherein the resolving step further comprises:
    intercepting the request for access to documents when the request is directed to the user-friendly handle;
    finding a matching identity information document having a user-friendly handle that matches the user-friendly handle in the request;
    determining the machine location from the matching identity information document; and
    amending the request to substitute the user-friendly handle with the machine location.

20. The method of 7 further comprising:
    delivering a path name combined with the user-friendly handle to the accessing node; and
    parsing the path name from the user-friendly handle prior to resolving the user-friendly handle with the machine location.

21. The method of claim 20 further comprising:
    adding the path name to the request for access to documents before sending the request to the publishing node.

22. The method of claim 7 wherein the identity information document further comprises more than one machine location for principal identified by the user-friendly handle.

23. A method of using a user-friendly handle to access documents stored on a first computer system in a network environment, the method comprising:
    storing at a second computer system an identity information document from the first computer system, the identity information document comprising a user-friendly handle identifying a first user of the first computer system and a machine location of the first computer system;
    implementing a user interface on the second computer system to enable a second user of the second computer system to request access to documents stored on the first computer system;
    receiving at the user interface implemented on the second computer system a request from the second user of the second computer system to access a first document of the documents stored on the first computer system, the request including the user-friendly handle and being directed to the first computer system;
    intercepting at the second computer system the request from the user interface to access the first document;
    amending at the second computer system the request to replace the user-friendly handle with the machine location of the first computer system;
    sending the amended request from the second computer system to the machine location of the first computer system; and
    accessing the first document at the second computer system.

24. The method of claim 23 wherein the user-friendly handle is an email address.

25. The method of claim 23 wherein the machine location comprises an IP address.

26. The method of claim 23 wherein the machine location comprises a public key.

27. The method of claim 26 further comprising:
    using the public key to determine the current machine location for the publishing node.

28. The method of claim 23 further comprising an initial step of:
    receiving the identity information document from the first computer system.

29. The method of claim 23 further comprising receiving published documents from the first computer system.

30. A first computer system having a processor comprising:
    a storage module for storing an identity information document received from a second computer system, the identity information document comprising a user-friendly handle identifying a principal of the second computer system and a machine location for the second computer system;
    a communication module communicatively connected to the storage module for sending from a user of the first computer system requests for access to documents stored on the second computer system;

a name resolution module communicatively connected to the storage module and the communication module for intercepting the requests for access to documents stored on the second computer system and amending each request to replace the user-friendly handle with the machine location; and a user interface module configured to enable the user of the first computer system to access and control any of the storage module, the communication module, and the name resolution module.

31. The computer system of claim 30 wherein the user-friendly handle is an email address.

32. The computer system of claim 30 wherein the machine location comprises an IP address.

33. The computer system of claim 30 wherein the machine location comprises a public key.

34. The computer system of claim 30 further comprising:
a communication module connected to the name resolution module for sending and receiving communications to and from the second computer system.

35. A computer program data product, stored on a memory device, readable by a computing system and encoding instructions for executing a computer process for name resolution, said computer process comprising:

storing at an accessing computer system an identity information document from a publishing computer system, the identity information document comprising a user-friendly handle identifying a principal and a machine location for the publishing computer system;

receiving at a user interface implemented on the accessing computer system instructions from a user of the accessing computer system to generate a request for access to documents stored on the publishing computer system, the request including the user-friendly handle;

intercepting the request for access to documents stored on the publishing computer system, wherein the request contains the user-friendly handle; and amending at the accessing computer system the request to replace the user-friendly handle with the machine location.

36. The computer process of claim 35 wherein the user-friendly handle comprises an email address.

37. The computer process of claim 35 wherein the machine location comprises an IP address.

38. The computer process of claim 35 wherein the machine location comprises a public key.

39. The computer process of claim 38 further comprising:
using the public key to determine the current machine location for the publishing node.

40. The computer process of claim 38 further comprising:
registering an encrypted machine name and a registered machine location for the publishing node with a DNS server;

resolving the user-friendly handle with the public key;

converting the public key to the encrypted machine name;

using the encrypted machine name to look up the registered machine location for the publishing node on the DNS server; and sending the request for access to documents to the registered machine location.

41. The computer process of claim 40 wherein the converting step comprises performing an algorithm on the public key.

42. The computer process of claim 35 wherein the identity information document further comprises more than one machine location for principal identified by the user-friendly handle.

* * * * *